(12) United States Patent
Kiener et al.

(10) Patent No.: US 11,962,955 B2
(45) Date of Patent: Apr. 16, 2024

(54) PORT OCCUPANCY DETECTION FOR HIGH DENSITY PANELS

(71) Applicant: CommScope Technologies LLC, Hickory, NC (US)

(72) Inventors: Matthew R. Kiener, Richardson, TX (US); Steven W Knoernschild, Allen, TX (US); Ryan E. Enge, Carrollton, TX (US); Michael Gregory German, Secaucus, NJ (US); Jason Bautista, Mayer, MN (US); Scott C Sievers, Jordan, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 435 days.

(21) Appl. No.: 17/286,731

(22) PCT Filed: Nov. 19, 2019

(86) PCT No.: PCT/US2019/062201
§ 371 (c)(1),
(2) Date: Apr. 19, 2021

(87) PCT Pub. No.: WO2020/106711
PCT Pub. Date: May 28, 2020

(65) Prior Publication Data
US 2021/0385559 A1  Dec. 9, 2021

Related U.S. Application Data

(60) Provisional application No. 62/770,067, filed on Nov. 20, 2018.

(51) Int. Cl.
*H04Q 1/06* (2006.01)
*H04L 12/66* (2006.01)
(Continued)

(52) U.S. Cl.
CPC .............. *H04Q 1/136* (2013.01); *H04L 12/66* (2013.01); *H04Q 1/06* (2013.01); *H04Q 1/16* (2013.01); *H04Q 1/24* (2013.01); *H04W 84/18* (2013.01)

(58) Field of Classification Search
CPC ............ H04Q 1/136; H04Q 1/06; H04Q 1/16; H04Q 1/24; H04L 12/66; H04W 84/18
(Continued)

(56) References Cited

U.S. PATENT DOCUMENTS

| 6,522,737 B1 | 2/2003 | Bartolutti et al. |
| 8,690,593 B2 | 4/2014 | Anderson et al. |

(Continued)

FOREIGN PATENT DOCUMENTS

| AU | 2010213548 A1 * | 9/2011 | ........... H01R 13/665 |
| JP | 2009536415 A | 10/2009 | |

(Continued)

OTHER PUBLICATIONS

European Patent Office, "Extended European Search Report from EP Application No. 19887105.5", from Foreign Counterpart to U.S. Appl. No. 17/286,731, filed Jun. 24, 2022, pp. 1 through 8, Published: EP.

(Continued)

*Primary Examiner* — Peter G Leigh
(74) *Attorney, Agent, or Firm* — Fogg & Powers LLC

(57) ABSTRACT

Port occupancy detection for connector panels is provided. In one embodiment, a connector panel comprises: a communications unit communicatively coupled to a network; and at least one modular port adapter assembly comprising: a plurality of communications couplers; and a plurality of port occupancy sensors each coupled to a sensor circuit. Each of the port occupancy sensors are configured to sense when the couplers are occupied. The panel communications
(Continued)

unit obtains from the sensor circuit which of the couplers are occupied. The panel communications unit communicates port occupancy information to a gateway indicating circuit which of the couplers are occupied. A chassis including sidewalls extends between a front and a rear to define an interior, and including guides on the sidewalls. A plurality of blades mounted to the guides of the chassis, each blade including a midplane bus assembly configured to communicatively couple the sensor circuit to the panel communication unit.

33 Claims, 12 Drawing Sheets

(51) Int. Cl.
    *H04Q 1/02*         (2006.01)
    *H04Q 1/16*         (2006.01)
    *H04Q 1/24*         (2006.01)
    *H04W 84/18*       (2009.01)

(58) Field of Classification Search
    USPC ........................................................ 439/540.1
    See application file for complete search history.

(56) References Cited

U.S. PATENT DOCUMENTS

| | | | |
|---|---|---|---|
| 9,019,968 B2 * | 4/2015 | Shar | H04Q 1/136 370/400 |
| 9,176,294 B2 * | 11/2015 | Smrha | G02B 6/3895 |
| 9,285,552 B2 | 3/2016 | Marcouiller et al. | |
| 9,423,570 B2 | 8/2016 | Petersen et al. | |
| 9,538,262 B2 * | 1/2017 | German | G06F 13/4282 |
| 9,709,765 B2 | 7/2017 | Wells et al. | |
| 9,769,939 B2 * | 9/2017 | Coffey | H01R 13/641 |
| 9,967,983 B2 * | 5/2018 | Coffey | H01R 25/006 |
| 2011/0043333 A1 | 2/2011 | German | |
| 2011/0043371 A1 * | 2/2011 | German | G06F 13/4282 340/815.45 |
| 2011/0092100 A1 * | 4/2011 | Coffey | H01R 25/006 29/842 |
| 2013/0064249 A1 | 3/2013 | Shar et al. | |
| 2015/0370025 A1 | 12/2015 | Wells et al. | |
| 2017/0111248 A1 * | 4/2017 | German | G06F 13/4068 |
| 2018/0224621 A1 | 8/2018 | Campbell et al. | |

FOREIGN PATENT DOCUMENTS

| | | |
|---|---|---|
| KR | 1020180028334 A | 3/2018 |
| WO | 2012142451 A2 | 10/2012 |

OTHER PUBLICATIONS

Commscope, "Systimax® EHD ULL fiber panels solution guide", CommScope, Inc., at least as early as May 6, 2018, pp. 1 through 14, commscope.com.
International Searching Authority, "International Search Report and Written Opinion from PCT Application No. PCT/US2019/062201" Mar. 12, 2020, pp. 1 through 15, Published: WO.
European Patent Office, "Extended European Search Report from EP Application No. 19887105.5", from Foreign Counterpart to U.S. Appl. No. 17/286,731, Jun. 24, 2022, pp. 1 through 8, Published: EP.

* cited by examiner

PORT OCCUPANCY DETECTION FOR HIGH DENSITY PANELS

CROSS-REFERENCE TO RELATED APPLICATIONS

This patent application is a U.S. national stage 371 application of International Patent Application No. PCT/US2019/062201 filed on 19 Nov. 2019, claiming priority to, and the benefit of, U.S. Provisional Patent Application No. 62/770,067, titled "PORT OCCUPANCY DETECTION FOR HIGH DENSITY PANELS" filed on 20 Nov. 2018, each of which mare incorporated herein by reference in their entirety.

BACKGROUND

A commercial data center is a facility that may be used to run the computer-based applications that handle the core electronic business and operational data of one or more organizations and/or to provide large numbers of users simultaneous, secure, high-speed, fail-safe access to their web sites run by such organizations. These data centers may host hundreds, thousands or even tens of thousands of servers, routers, memory storage systems and other associated equipment. In these data centers, fiber optic communications cables and/or communications cables that include insulated conductive wires are typically used to provide a hard-wired communications system that interconnects the data center equipment.

In both office network and data center communications systems, a variety of communications devices can be used for switching and connecting communications signal transmission paths in a communications network. Some such communications devices are installed in one or more equipment racks to permit organized, high-density installations to be achieved in limited space available for equipment. Installing a large number of connections in an equipment rack is efficient with respect to floor space, but places a premium on the ability to manage and maintain the communications cables leading to and away from these equipment racks. Further, due to the increasing demand for communications system capacity, it is desirable to increase the density of connections within a given space that can be achieved. However, the increased density of connections increases the difficulty of accurately determining which ports are available to support additional connections versus which ports are already occupied.

SUMMARY

The Embodiments of the present disclosure provide methods and systems for port occupancy detection for high density panels and will be understood by reading and studying the following specification.

Port occupancy detection for connector panels is provided. In one embodiment, a port occupancy monitoring system comprises: a gateway coupled to a network; and a plurality of connector panels coupled to the network, each connector panel comprising a bladed panel system that includes a panel communications unit communicatively coupled to the network; wherein the bladed panel system comprises: a chassis including sidewalls extending between a front and a rear to define an interior, the chassis including guides, the guides extending in a forward-rearward direction; and a plurality of blades mounted to the guides of the chassis, each blade including at least one modular port adapter assembly comprising: a plurality of communications couplers; and a plurality of port occupancy sensors each coupled to a sensor circuit, wherein each of the plurality of port occupancy sensors are configured to sense when one or more of the plurality of communications couplers are occupied by a connector for a segment of physical communications media; wherein the panel communications unit is configured to obtain from the sensor circuit which of the plurality of communications couplers are occupied; and wherein the panel communications unit communicates port occupancy information to the gateway indicating which of the plurality of communications couplers are occupied.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide solutions that eliminate the need for manual auditing to determine port occupancy for high-density installations by introducing a port occupancy sensing system that is economical, can be installed within the limited space available in a high-density installation, and is a hardware-resident solution that does not require server resources. As discussed below, these embodiments provide a system that allows a datacenter or similar network communication system operator to use a remote device to query current physical port occupancy information for connector panels and receive notifications when port occupancy information changes. Further, the port occupancy status for hundreds of shelves can be monitored through a single customer network port.

Figure 1:
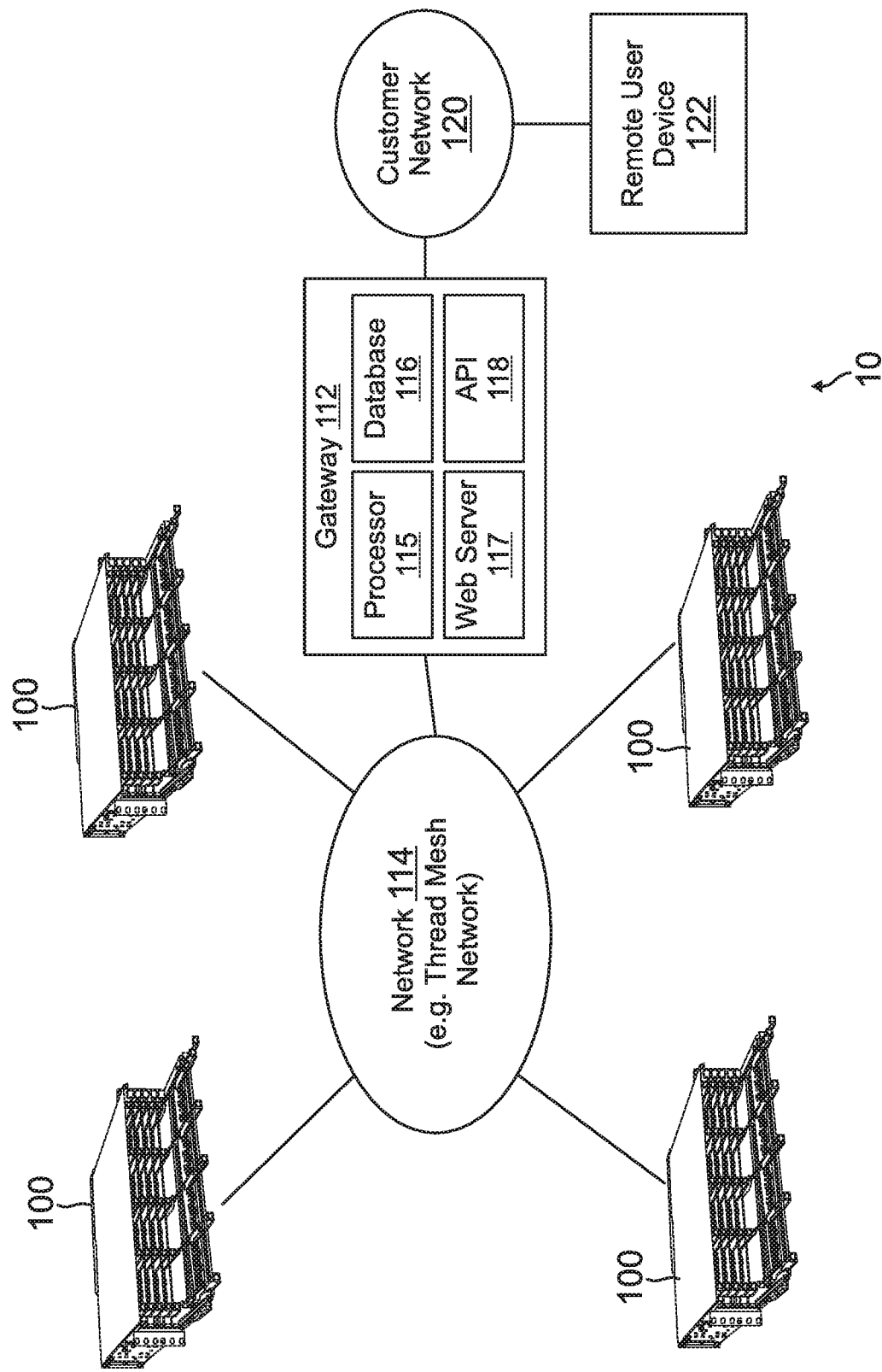
FIG. 1 is a diagram illustrating an example embodiment of a network communications system comprising a plurality of connector panels.

FIG. 1 is a diagram illustrating a network communications system 10 (such as an office network or data center communications system, for example) comprising a plurality of connector panels 100. In the particular example shown in FIG. 1, each of the connector panels 100 comprise a standard 2U panel that supports 144 LC-pair fiber connection ports. However, in various possible implementations, the connector panels 100 may comprise any combination of panel sizes (1U, 2U, 4U, etc.) supporting different numbers and types of connection ports. Moreover, it should be understood that in alternate embodiments, there may be any number of connector panels 100 within the system 10. In some embodiments, the connector panels 100 may comprise, but are not limited to, high-density connector panels.

With embodiments of the present disclosure, the connector panels 100 include port occupancy sensors that detect which ports of that panel are occupied, and which are available. Each connector panel 100 further includes at least one panel communication unit that communicates the port occupancy status information for that panel 100 to a gateway 112. The gateway 112 functions to connect the network 114 to customer network 120 (such as an IPv4/IPv6 Ethernet Local Area Network (LAN) for example). In some embodiments, the gateway 112 also aggregates the port occupancy status information from each of the connector panels 100 and provides access to that information to remote users 122 via the customer network 120. For example, in some embodiments, the gateway 112 includes a processor 115, an optional database 116 and a web server 117 and/or application program interface (API) 118 executed by the processor 115. The database 116 that stores the port occupancy status information for each of the connector panels 100, and remote user may send queries to the web server 117 and/or API 118 to determine the port occupancy status of a specific port on a specific panel, or to obtain the port occupancy status for all the ports of that panel. For example, the gateway 112 may implement a HyperText Transfer Protocol (HTTP) Representational State Transfer (RESTful) API that enables HTTP requests to GET, PUT, POST and DELETE data from the database 116. In some embodiments, the RESTful API may be accessed by the remote user through the gateway 112 to make port occupancy status requests and/or receive port occupancy status change notifications.

The connector panels 100 and gateway 112 communicate port occupancy status and other information between each other via the network 114. In alternate embodiments, the network 114 may comprise a wired network (such as an Ethernet network or RS-485 LAN, for example) a wireless network, or comprise a combination of both wired and wireless network connections.

In the embodiment shown in FIG. 1, network 114 comprises a wireless Thread based mesh network where each of the connector panels 100 and gateway 112 comprise nodes of the network 114. While each connector panel 100 would need its own network connection and may consume a switch port for a traditional point-to-point network, by implementing the network 114 as a mesh network the gateway 112 is the only device consuming a switch port on the client's network 120. In such a network, the adding of connector panels 100 to the network 114 actually serves to expand the network coverage of network 114 because each connector panels 100 acts as a node that other connector panels 100 can communicate with in order to route their port occupancy status information to the gateway 112. As the term is used herein, "Thread" refers to the IPv6-based, low-power mesh networking technology known to those of skill in the art of mesh networks. Thread uses IPv6 over Low-Power Wireless Personal Area Networks (LP-WPAN) with the IEEE 802.15.4 wireless protocol with mesh communication. With a Thread mesh network, the connector panels 100 are each individually network-addressable nodes. As such, the gateway 112 may be programmed to pass communications directly between a remote user 122 and a connector panels 100 using the panel's IPv6 address. In this case, a panel's communications unit 160 may implement a customer-accessible API such as an HTTP RESTful API. It should be understood however that network 114 may be implemented using another wireless mesh protocol, such as Zigbee (which is also an IEEE 802.15.4-based protocol) or Z-wave for example.

Figure 1A:
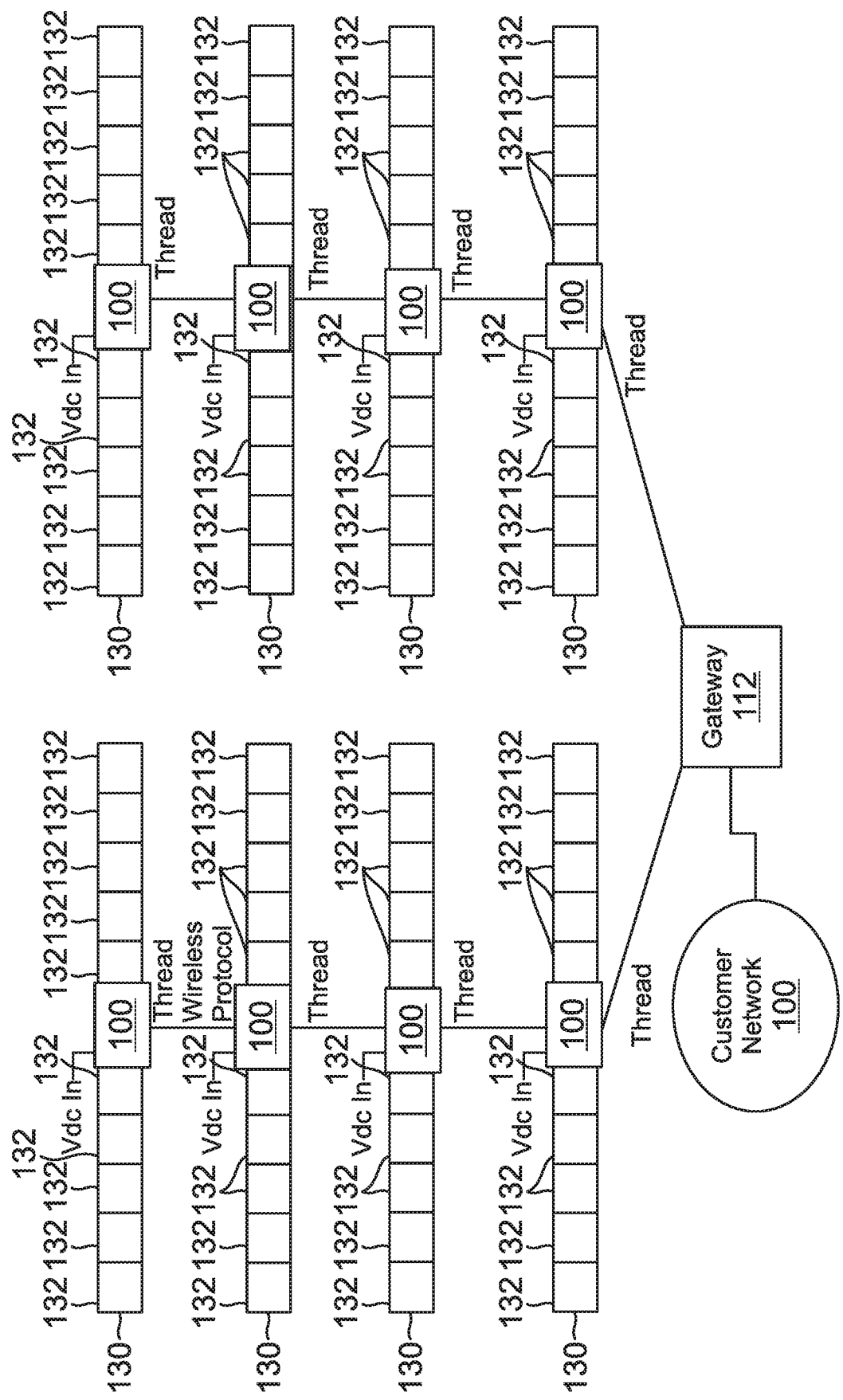
FIGS. 1A, 1B and 1C are diagrams illustrating of an example datacenter floorplan layout comprising rows of equipment racks or cabinets and an example embodiment of a network communications system.

FIG. 1A is an alternate illustration of network communications system 10 illustrating a plurality of equipment rows 130 each comprising a plurality of network racks or cabinets 132. Each network rack 132 may be populated with network equipment such as, but not limited to, network switches, servers, routers, rack controllers, patch panels, and the like. In this embodiment, each equipment row 130 includes at least one rack 132 that has a connector panels 100 installed therein. In this example embodiment, each of the connector panels 100 comprises a node of the mesh network 114, which eliminates the need for wiring between each connector panel 100 and the gateway 112. If an additional row 130 is installed, the connector panel 100 for that row will simply wirelessly connect to the nearest connector panel 100 in another row in order to send port occupancy data to the gateway 112. Similarly, if an existing connector panel 100 becomes unavailable, the network 114 is self-healing such that the remaining connector panels 100 will re-establish connections among themselves in order to send port occupancy data to the gateway 112.

Figure 1B:
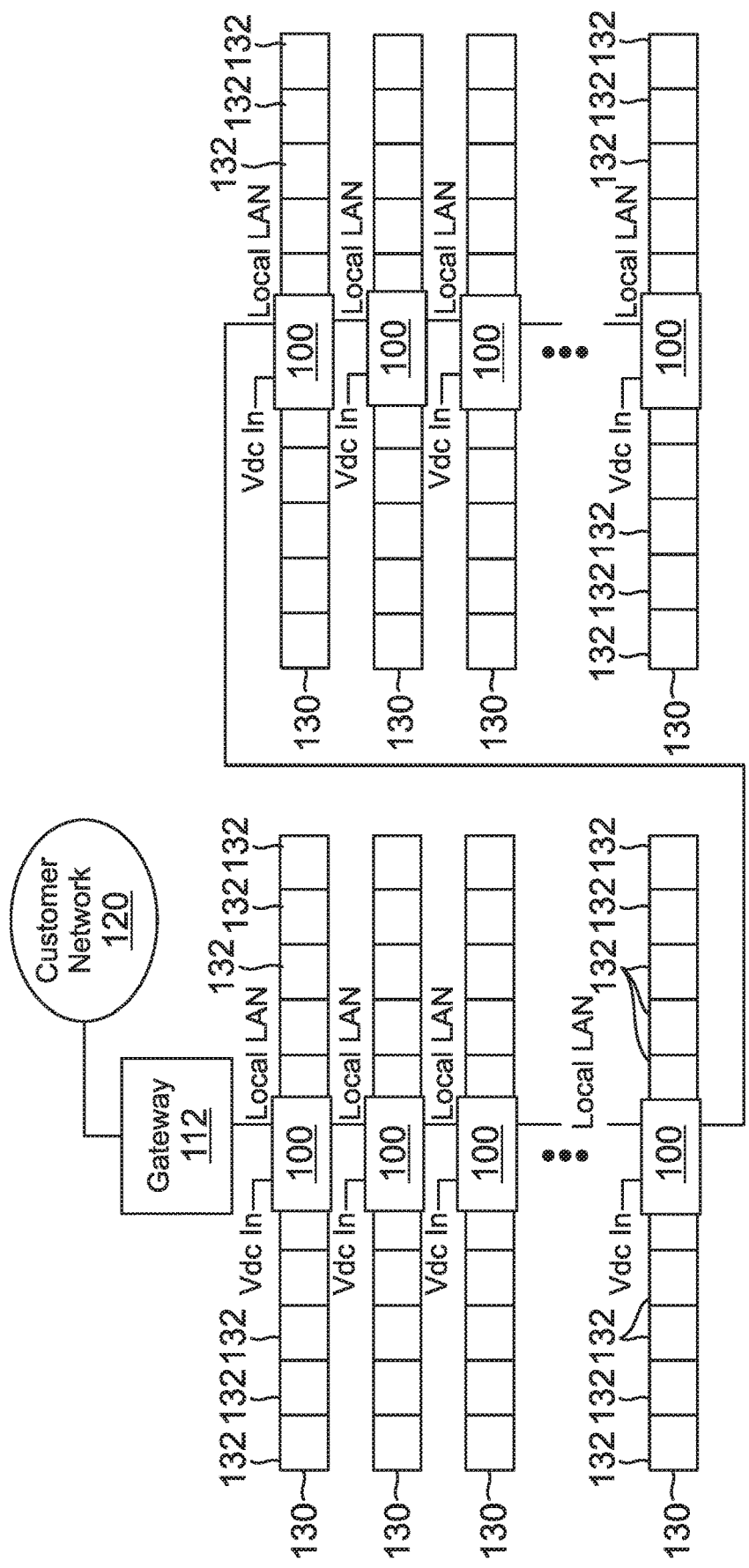
Figure 1C:
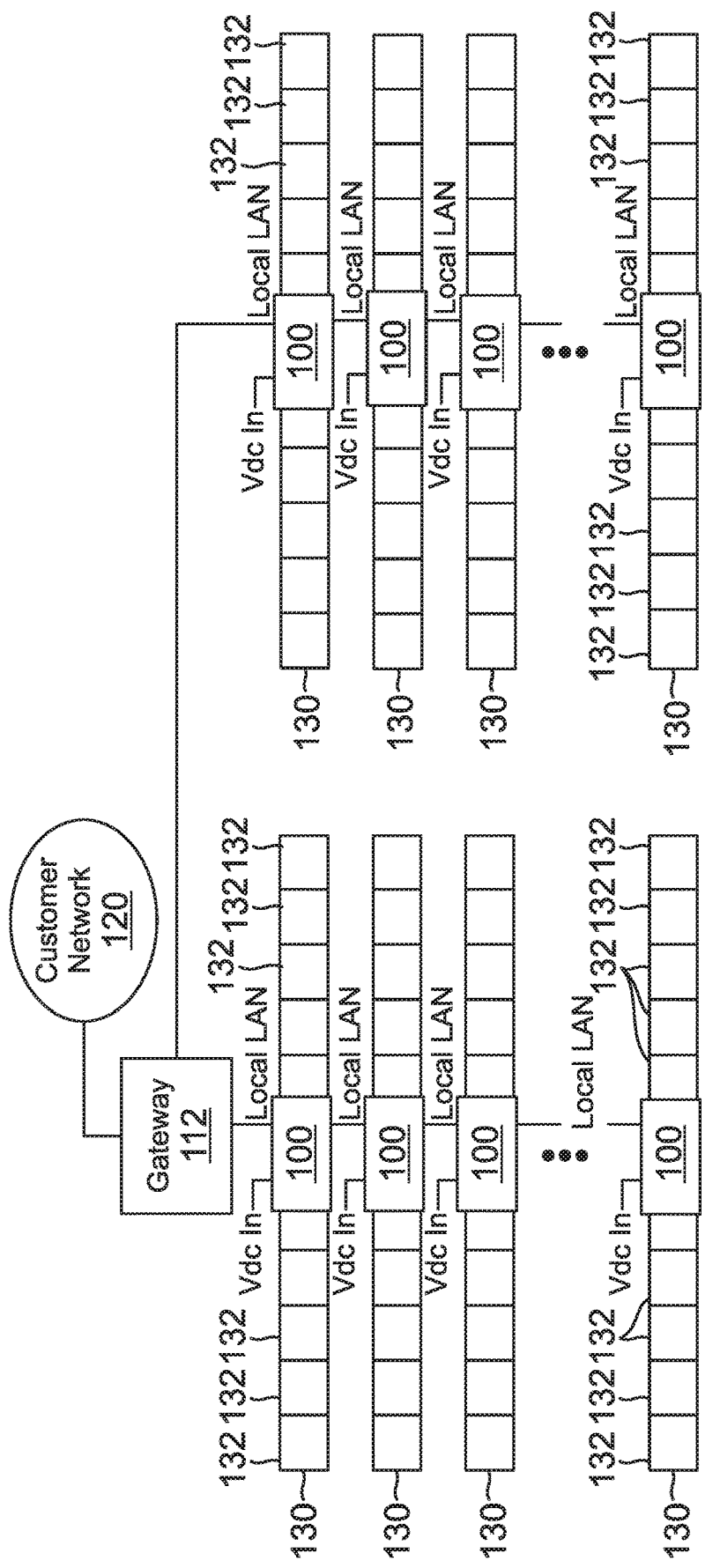

FIG. 1B is another alternate illustration of network communications system 10 illustrating a plurality of equipment rows 130, each comprising a plurality of network racks 132 with at least one rack 132 that has a connector panels 100 installed therein. In this implementation the network 114 is a wired network where each connector panels 100 comprises a wired network interface for connecting to network 114. It should be understood that when implemented as a wired network 114, the network is not limited to any particular network topology or standard protocol. Each local LAN segment between connector panels 100 and the gateway 112 could be implemented, for example, with Ethernet or RS485 or I$^2$C. In some embodiments, such as shown in FIG. 1C, two physical wired network daisy chains may be supported from a single gateway 112.

Figure 1D:
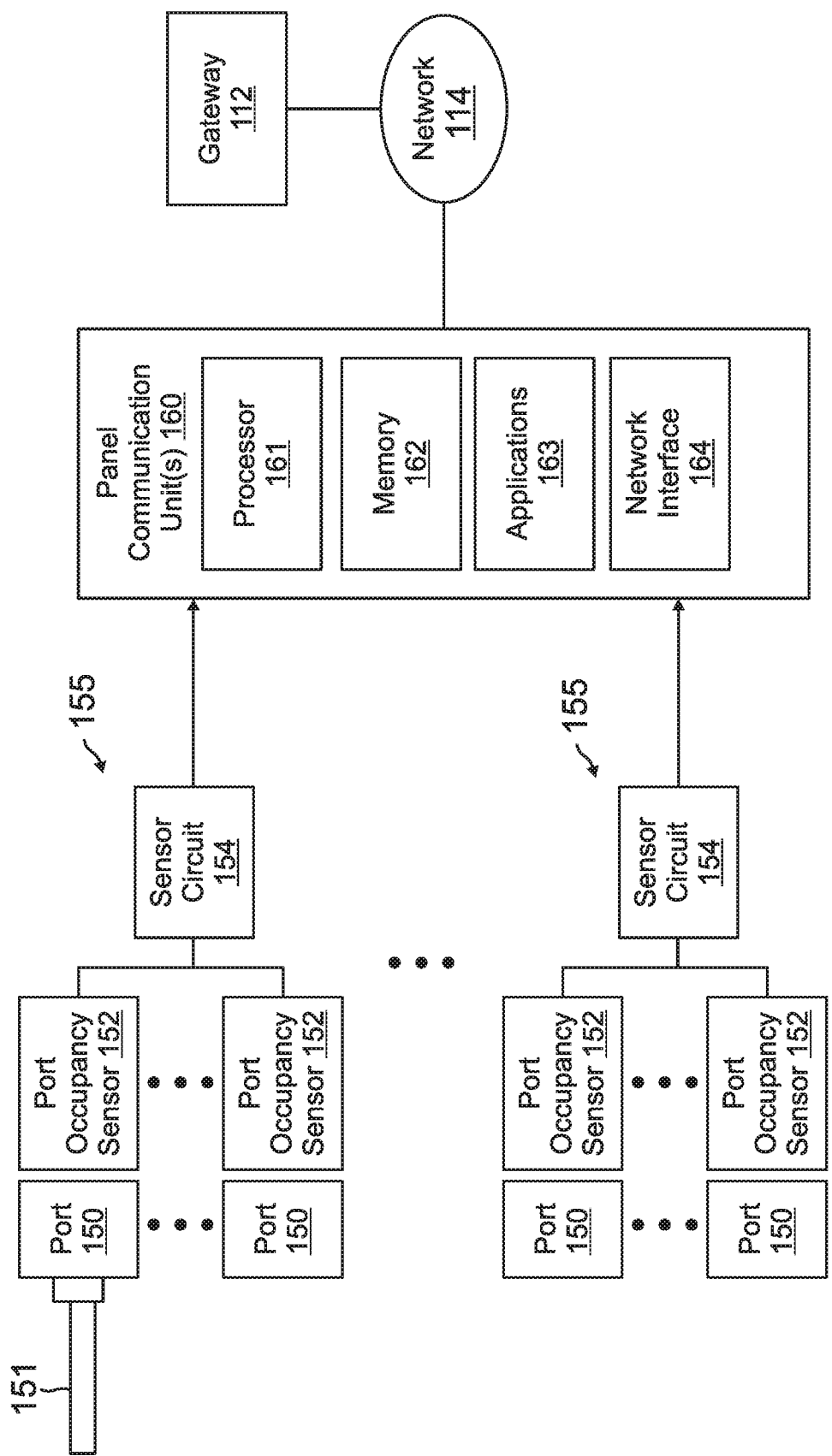
FIG. 1D is a block diagram illustrating an example connector panel embodiment of the present disclosure.

FIG. 1D is a block diagram illustrating an example embodiment connector panel 100 of the present disclosure. Connector panel 100 comprises at least one port adapter assembly 155 comprising a plurality of communications couplers 150 (i.e., network ports) for connecting physical communications media 151 (such as an electrical or fiber optic cable) to the Connector panel 100. For the particular example illustrated in FIG. 1D, each communications coupler 150 comprises a duplex Lucent Connector (LC) port that facilitates a fiber optic network data cable connection to Connector panel 100. In various other embodiments, the communications couplers 150 may by compatible with other optical fiber connector formats such as Standard Connector (SC), multiple-fiber push-on/pull-off (MPO/MTP) connectors, LX.5 connectors, ST connectors, FC connectors, RJ-45 connectors, E-2000 connectors, SN connectors, CS connectors, or other connectors suitable for connecting to optical fibers known to one having skill in the art. It should be understood that the term "port adapter assembly", in addition to covering pass-through adapters, is also intended to include modules (such as LC-MPO modules, for example) and splice cassette modules (such as LC splice cassette modules, for example). In still other embodiments, the communications couplers 150 may couple with network data cables comprising electrical conductors such as, but not limited to, coaxial cable, Category (CAT) 5, CAT 6A, CAT 7, CAT 8, or other cable that is able to function as a physical medium for the transmission of data. In some embodiments, network data cables coupled to the communications couplers 150 may comprise hybrid cables that include both optical fiber and electrical conductors. Each port adapter assembly 155 further comprises a plurality of port occupancy sensors 152, each coupled to a sensor circuit 154. The port occupancy sensors 152 are each associated with respective communications couplers 150. Each port occupancy sensor 152 comprises circuitry (including a contact or micro switch, for example) that senses when a connector for a segment of physical communications media 151 occupies a communications coupler 150. In some embodiments, where a port (such as an LC port, for example) may receive multiple individual fibers, the port occupancy sensors 152 can be provided and arranged for sensing each fiber individually. In some embodiments, port occupancy sensors 152 may be used to sense occupancy of communications coupler located on both the front and back sides of adapter assemblies and modules. For example, such a configuration may be used to cover both legs (fibers) of an LC or other coupler. Similarly, port occupancy sensors 152 may be arranged to sense occupancy of the front side couplers of a module (such as LC-MPO module, for example), and port occupancy sensors 152 may be arranged to also sense occupancy of back side connections (such as to detect the occupancy of an MPO connector, for example).

In one embodiment when a connector for a segment of physical communications media 151 is inserted into a communications coupler 150, the connector depresses a contact of the port occupancy sensors 152 causing a logic state to change at an I/O port of the sensor circuit 154. For example, closure of the contact of the port occupancy sensors 152 may pull a sense voltage from a logic high value to a logic low value, or vice versa. The sensor circuit 154 detects the logic change. The panel communication unit 160 can then read the logic values from the sensor circuit 154 to determine port occupancy based on which ports have a logic high value and which port have a logic low value. In some embodiments, a change in logic value can initiate an interrupt or other signal to be sent from the sensor circuit 154 to the panel communication unit 160 to prompt the panel communication unit 160 to read the logic value from the sensor circuit 154.

In the embodiment shown in FIG. 1D, the panel communication unit 160 comprises a processor 161 and memory 162 that execute one or more applications 163 to implement the functions of the panel communication unit 160 as described herein. The panel communication unit 160 also includes a network interface 164. Network interface 164 is configured to establish a communications link between the panel communications unit 160 and the gateway 112 via the network 114. Where the network 114 comprises a wireless and/or mesh network, the network interface 164 comprises a compatible network protocol stack for wireless communication with the network 114.

Application 163 processes port occupancy logic information obtained from each sensor circuit 154 for each port adapter assembly 155 of the connector panel 100, mapping the port occupancy status indicated by the logic signals to port numbers (or other port identification information) corresponding to each of the communications couplers 150. In some embodiments, the application 163 may periodically poll the sensor circuit 154 to retrieve port occupancy status information. In some embodiments, the application 163 may poll the sensor circuit 154 to retrieve port occupancy status information in response to a signal (e.g. an interrupt) received from the sensor circuit 154 that indicates a port occupancy status has changed. In some embodiments the application 163 may retrieve port occupancy status information from the sensor circuit 154 in response to a request, query, or polling received from the gateway 112. In some embodiments, the retrieved port occupancy status information is stored in the memory 162 of the panel communication unit 160.

Upon request, application 163 may cause the network interface 164 to transmit to the gateway 112 the port occupancy status information it has collected for that connector panel 100. In some embodiments the panel communications unit 160 may transmit port occupancy status information to the gateway 112 in response to a request, query, or polling received from the gateway 112. In some embodiments, the panel communications unit 160 may transmit port occupancy status information to the gateway 112 in response to an occupancy status change being detected in one or more of the communications couplers 150. In some embodiments, the panel communications unit may transmit a signal to the gateway 112 in response to an occupancy status change being detected in one or more of the communications couplers 150, which causes the gateway 112 to respond by polling the panel communications unit 160 for port occupancy status information. The port occupancy status information received at the gateway 112 may be associated in the database 116 in a record or database object associated with the connector panel 100 that provided the information, and/or reported to a remote user 122 in real time.

In this way, a remote user 122 may obtain from the gateway 112 sufficient information to determine the occupancy status of any communications coupler 150 for any connector panel 100 in the datacenter 10. In some embodiments, the remote user 122 may comprise an automated management system such as, for example, a work order management system or a connectivity management system. For example, the occupancy status information may be used to automatically detect and record the completion of a work-order by a field technician or of specific connect/disconnect steps of the work order. In some embodiments, the occupancy status information may be used to automatically infer cross-connected patch cord connections based on adjacency in time of consecutive port detections (often referred to as logical inference). For example, in some embodiments, port occupancy status may be received from the gateway 112 in real time. The consecutive detection of two ports becoming occupied within a certain time period may be used by a connectivity management system to make the logical inference that a cross-connected patch cord connection has been made between those ports and thusly the connection is automatically logged. In some embodiments, cross-connected patch cord connections may be logged in conjunction with detection of completed work order connect/disconnect steps.

Figure 2:
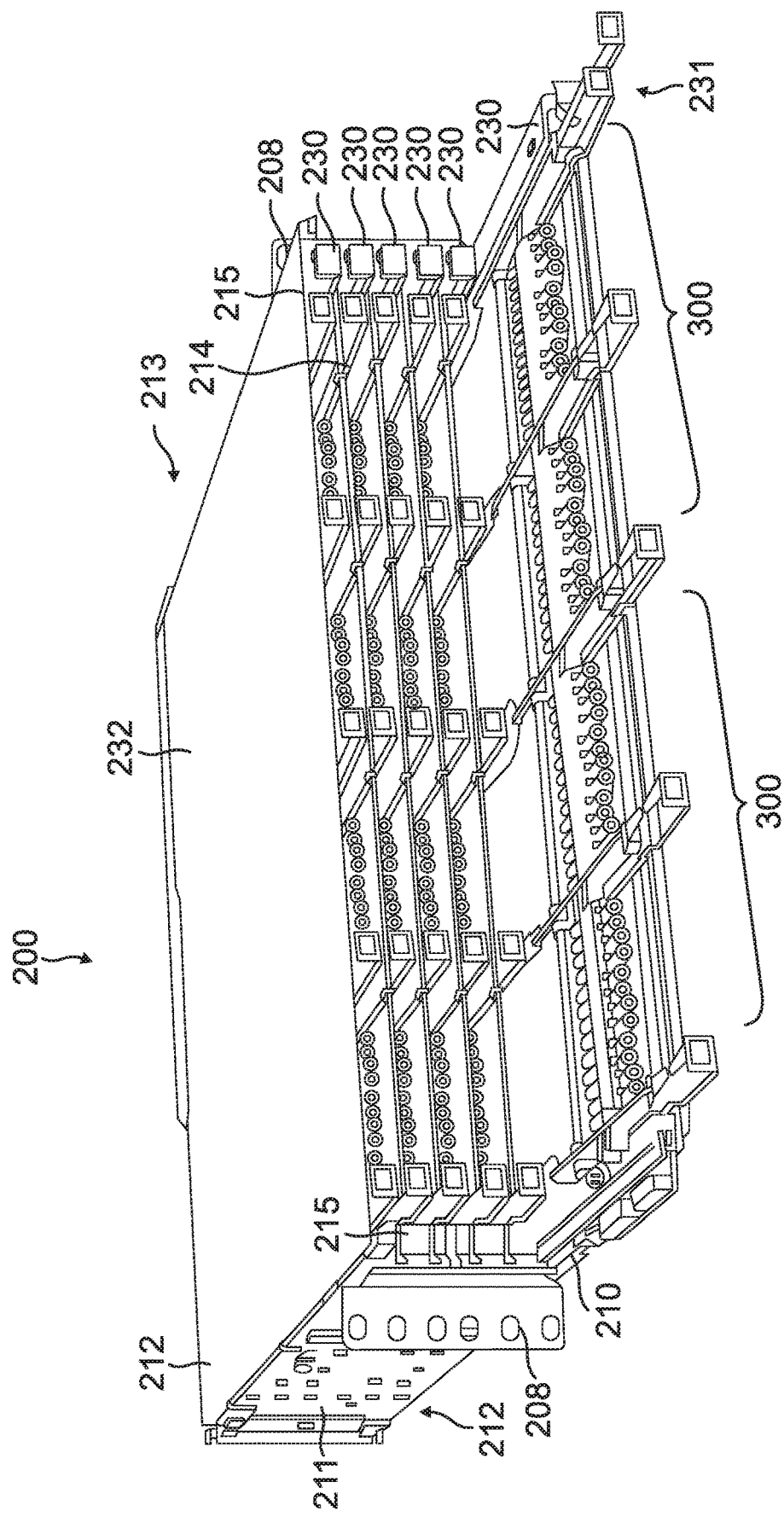
FIG. 2 is a diagram illustrating an example embodiment of a connector panel implemented as a bladed panel system.

FIG. 2 provides an example connector panel 100 as shown in FIGS. 1 and 1A-1D. In this example embodiment, a connector panel 100 is implemented as a bladed panel system 200 suitable for mounting to a communications equipment rack 132. The bladed panel system 200 includes a chassis 210 configured to receive one or more trays referred to herein as communications blades 230. The chassis 210 includes opposing side walls 211 interconnected by opposing major surfaces 212 to form a chassis housing 213. In the example shown, the chassis housing 213 defines an open front and an open rear. In other implementations, one or both of the front and rear can be at least partially closed.

Mounting members 208 are mounted to the opposing side walls 211 to facilitate mounting the chassis housing 213 to a communications rack. In accordance with one implementation shown in FIG. 1A, the mounting members 208 are L-shaped flanges having first sections that attach to the side walls 211 and second sections that extend generally parallel with an open-end face of the chassis housing 213. In other embodiments, however, other types of mounting members 208 can be used to mount the chassis housing 213 to a rack 132. In still other embodiments, other types of mounting equipment can be used.

Guides 215 can be provided within an interior of the chassis housing 213. The guides 215 enable the blades 230 to move relative to the chassis housing 213. In certain embodiments, each blade 230 is configured to move separately from the other blades 230. In certain implementations, the blades 230 are configured to travel along the connector insertion axes. For example, the blades 230 may be configured to travel in a forward-rearward direction. In some embodiments, the guides 215 enable each blade 230 to move between at least a first position, in which the blade 230 is positioned within the interior 214 of the chassis housing 213, and a second position, in which at least a portion of the blade 230 protrudes outwardly from the interior 214 of the chassis housing 213. In FIG. 2, the blade 230 shown at 231 is in the second position. Moving a blade 230 to the second position can facilitate access to communications couplers 250 mounted to the blade 230. For example, if a user wants to add, remove, or replace a physical media segment on a blade 230, then the user can slide the blade 230 open to the second position a forward extended position to access the desired segment, coupler port, or other component without disconnecting the remaining components on the blade 230 from the network.

Examples of bladed panels suitable for implementing the connector panel 100 of FIGS. 1 and 1A-1D are shown and described in U.S. Pat. No. 9,709,765 and U.S. Publication No. 20180224621, the disclosures of which are both hereby incorporated herein by reference in their entireties.

Figure 3:
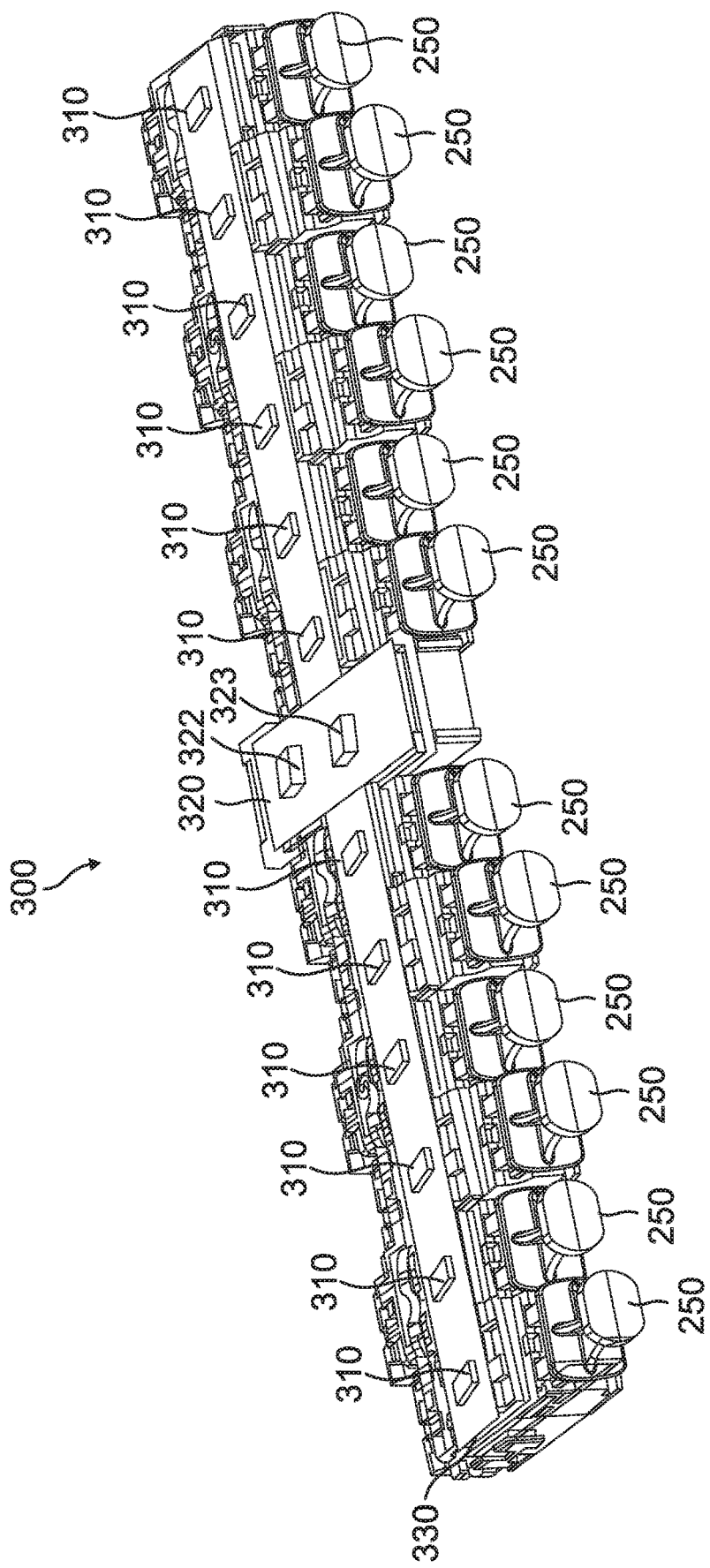
FIGS. 3 and 4 are diagrams illustrating an example modular port adapter assembly embodiment.

In one aspect illustrated in FIGS. 2 and 3, each blade 230 includes at least one port adapter assembly 300 which may be used to implement a port adapter assembly 155 such as described in any of the embodiments discussed above. The port adapter assembly 300 may each comprise a plurality of communications couplers 250, each coupler connecting segments of physical communications media (such as network data cables which carry communications signals) via connectors (for example, plug connectors). Each coupler 250 defines a port at which the plug connectors are received along respective connection insertion axes. In some implementations, each coupler 250 includes front and rear ports.

In some embodiments, a port adapter assembly 300 comprises a modular assembly that may be installed onto predefined locations onto each blade 230. It should be understood that in alternate implementations of any of the embodiments described herein, a specific port adapter assembly 300 may comprise any number of communications couplers 250 including a single communications coupler 250.

In accordance with some aspects, the communications couplers 250 can include fiber optic adapters for connecting optical fibers. Each blade 230 can carry one or more fiber optic adapters. In certain implementations, the fiber optic adapters can be grouped into one or more port adapter assemblies 300 (e.g., see FIG. 3). For the particular example illustrated in FIG. 1, each port adapter assembly 300 comprises 12 duplex Lucent Connector (LC) ports that facilitate fiber optic network data cable connections to the bladed panel system 200. In various other embodiments, the communications couplers 250 may be compatible with other optical fiber connector formats such as Standard Connector (SC), multiple-fiber push-on/pull-off (MPO/MTP) connectors, LX.5 connectors, ST connectors, FC connectors, RJ-45 connectors, E-2000 connectors, SN connectors, CS connectors, or other connectors suitable for connecting to optical fibers known to one having skill in the art. In still other embodiments, the communications couplers 250 may couple with network data cables comprising electrical conductors such as, but not limited to, coaxial cable, Category (CAT) 5, CAT 6A, CAT 7, CAT 8, or other cable that is able to function as a physical medium for the transmission of data. In some embodiments, network data cables coupled to the communications couplers 250 may comprise hybrid cables that include both optical fiber and electrical conductors. In accordance with other aspects, the couplers 250 on an example blade 230 can include transceivers for managing wireless communications signals. In accordance with still other aspects, however, the couplers 250 on an example blade 230 can include some combination of the above couplers or other types of communications couplers.

Also as illustrated in FIG. 3, each port adaptor assembly 300 comprises one or more port occupancy sensors 310 coupled to a sensor circuit 320. In one embodiment, the port occupancy sensors 310 coupled to a sensor circuit 320 may be implemented on a printed circuit board assembly (PCBA) 330 secured to the port adaptor assembly 300. In one embodiment, each port occupancy sensors 310 comprises an electrical sensor (such as a microswitch or electrical contact member, or any device that can toggle the electrical state of a sense circuit, for example) within the communications coupler 250. In some embodiments, the port occupancy sensors 310 is physically manipulated when a connector of a segment of physical communications media is inserted into the communications coupler 250 to cause a signal input to change state at the sensor circuit 320. In other embodiments, the port occupancy sensors 310 may comprise an infrared (IR) sensor such that an IR emitter sends IR light, and an IR detector senses different light levels based on occupancy of the coupler. In some embodiments, the sensor circuit 320 may comprise an I/O expander 322 coupled to a controller 323. For example, the I/O expander 322 may comprise a PCAL6524 24-bit general purpose I/O expander that provides remote I/O expansion via a Fast-mode Plus (Fm+) I$^2$C-bus interface, and controller 323 may comprise an I$^2$C EEPROM that can be read from the panel communication unit 160. As would be known by those skilled in the art, I$^2$C is a serial protocol for a two-wire interface to connect low-speed devices like microcontrollers, EEPROMs, A/D and D/A converters, I/O interfaces and other similar peripherals in embedded systems. I²C is often used for attaching lower-speed peripheral integrated circuits processors and microcontrollers for short-distance, intra-board communication.

Figure 4:
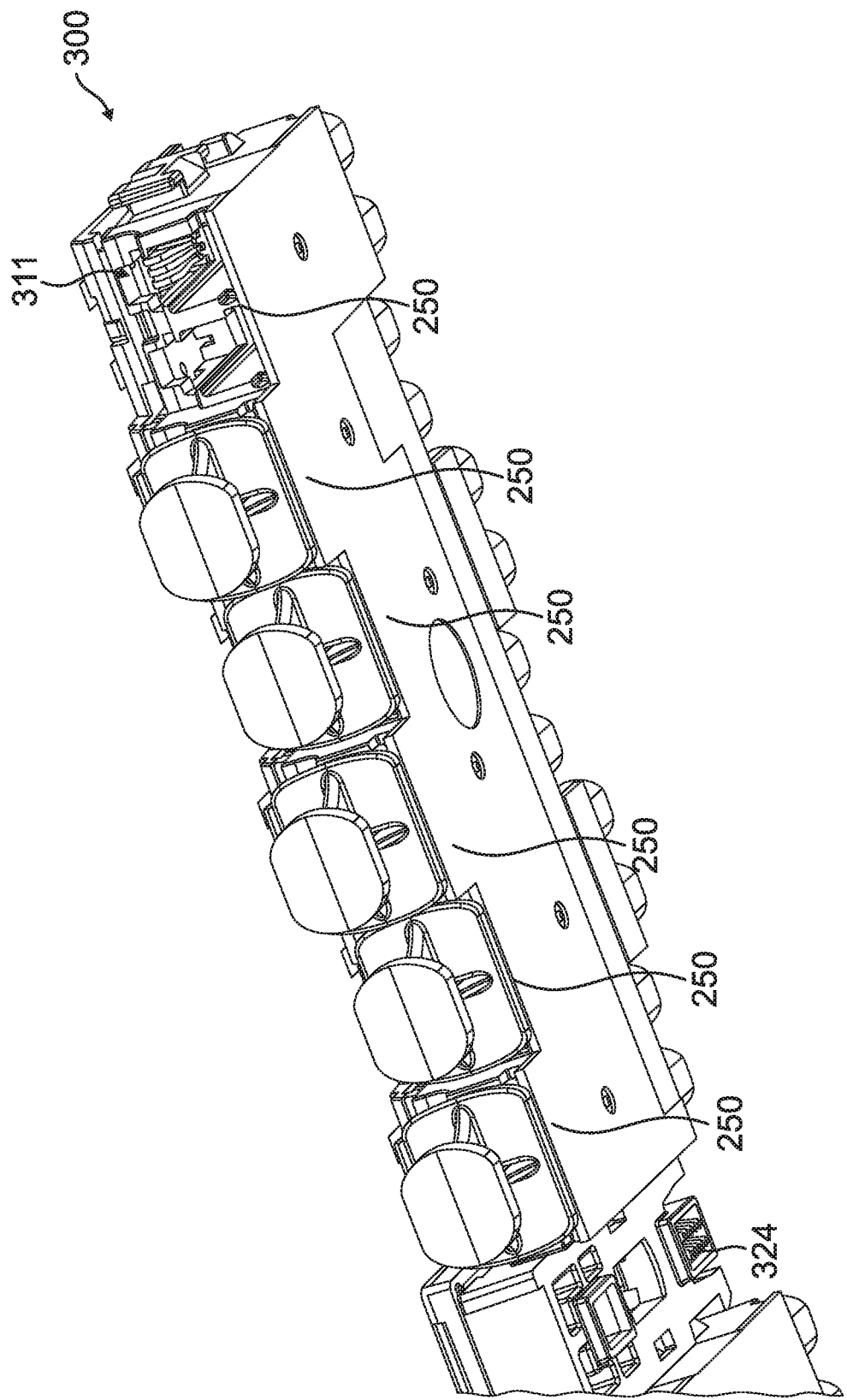
Figure 5:
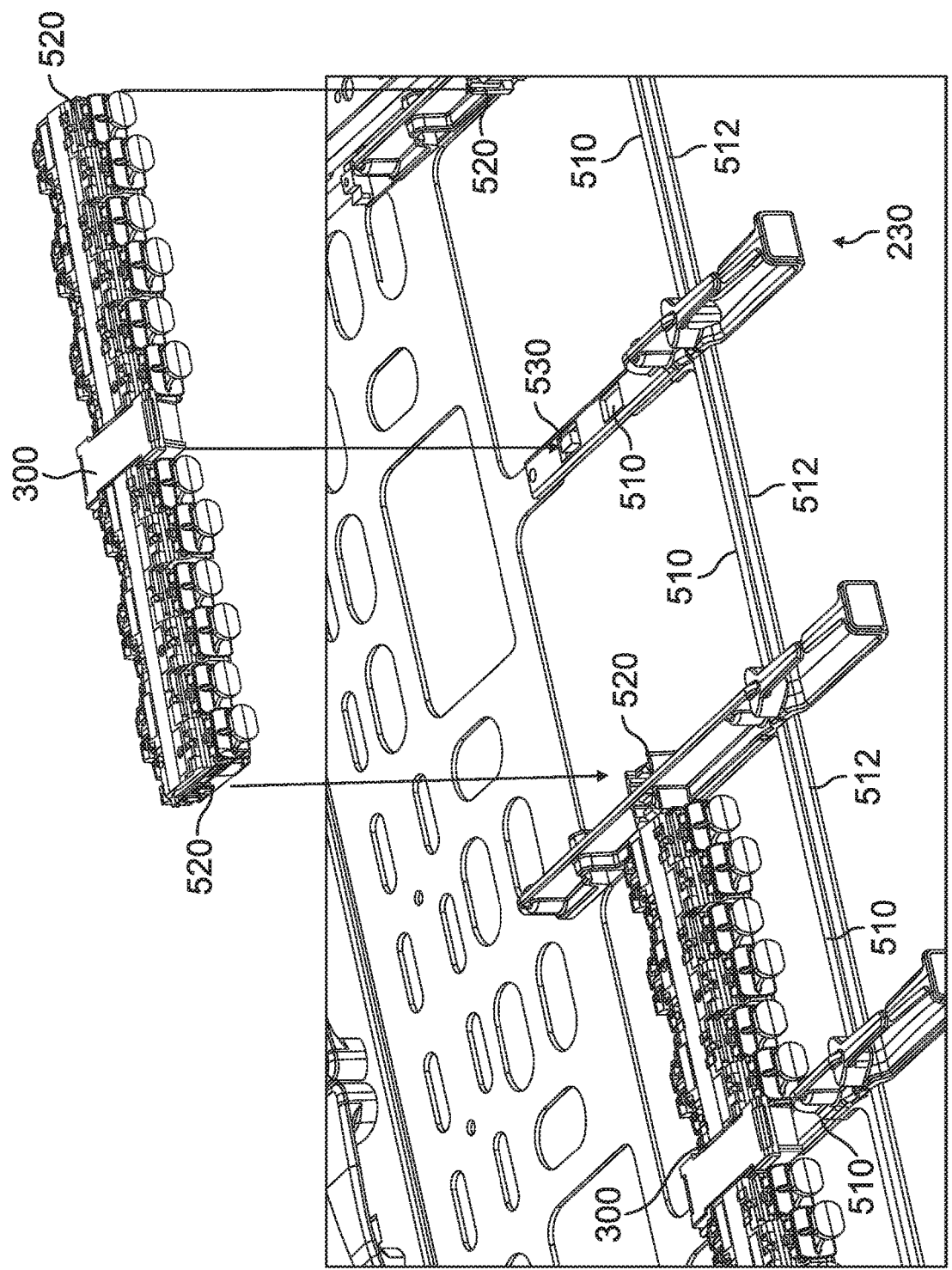
FIG. 5 is a diagram illustrating the installation of an example modular port adapter assembly to a blade and midplane bus assembly for one embodiment.

FIG. 4 is a diagram showing a bottom view of the port adaptor assembly 300 of FIG. 3. In some embodiments, the port occupancy sensors 310 comprise a passive sensor 311 such as a microswitch, one or more contact members configured to engage contacts on a printed circuit board positioned on top of the fiber optic adapter 300, or any device that can toggle the electrical state of a sense circuit, for example. An example port occupancy sensor 310 implemented using contact members is shown and described in U.S. Pat. No. 8,690,593, the disclosure of which is hereby incorporated herein by reference in its entirety. In particular, FIG. 4 illustrates an example sensor 311 of a port occupancy sensors 310 positioned within one of the communications couplers 250. Also as shown in FIG. 4, sensor circuit 320 includes a connector 324, which communicatively couples the sensor circuit 320 to the panel communications unit 160. In particular, the connector 324 electrically couples the sensor circuit 320 to a midplane bus assembly 510 as illustrated in FIG. 5 and discussed below.

Examples of port adaptor assemblies suitable for use in implementing the port adaptor assembly 300 are shown and described in U.S. Pat. Nos. 9,423,570 and 9,285,552, the disclosures of which are both hereby incorporated herein by reference in their entireties.

As already mentioned, port adapter assembly 300 is a modular component of the bladed panel system 200. This modularity is illustrated in FIG. 5. The port adapter assembly 300 and blade 230 each comprise corresponding mounting features (for example, connectors 520) which secure the port adapter assembly 300 into position on the blade 230. In one embodiment, the blade 230 further comprises a midplane bus assembly 510 that includes electrical traces for carrying communications signals between the sensor circuit 320 and the panel communications unit 160. The midplane bus assembly 510 may also distribute power to the port adapter assembly 300 for operating the sensor circuit 320 and port occupancy sensors 310. According to some embodiments, when the port adapter assembly 300 is installed into blade 230, the connector 324 of the sensor circuit 320 connects with a connector 530 positioned on the midplane bus assembly 510. The acts of insertion and removal of the port adapter assembly 300 each exert a force on the connector 520. The midplane bus assembly 510 may therefore be implemented as rigid element comprising, for example, a printed circuit board assembly, that is mechanically stable and can resists the forces from insertion and removal of the port adapter assembly 300 without incurring damage. The midplane bus assembly 510 may extend widthwise across the blade 230 (supported by one or more rails 512 or other structural components of the blade 230) and include one or more stubs that extend out to a position beneath the port adapter assembly 300 to facilitate coupling of the assembly connector 325 with the midplane bus assembly connector 530. Each midplane bus assembly 510 may comprise one, two, or any number of connectors 520 to accommodate a corresponding number of port adapter assemblies 300 that a blade 230 is configured to support.

Figure 6:
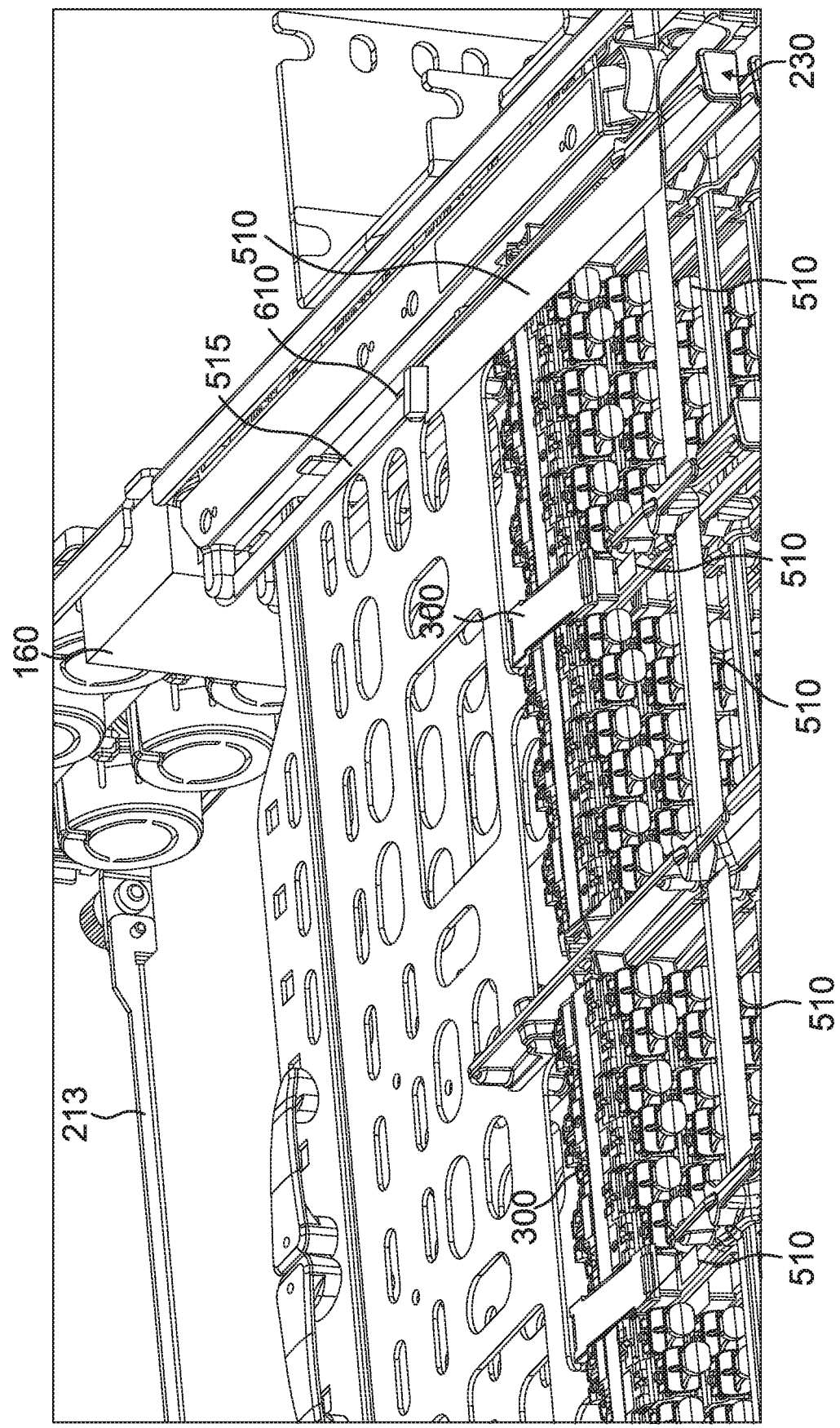
FIG. 6 is a diagram illustrating a cutaway top view of an example bladed panel system revealing a midplane bus assembly which is integrated into the structure of a blade onto which multiple port adapter assemblies are installed.

FIG. 6 is a diagram illustrating a cutaway top view of a bladed panel system 200 revealing a midplane bus assembly 510 which is integrated into the structure of a blade 230 onto which multiple port adapter assemblies 300 have been installed. In order to facilitate the ability to move the blade 230 in and out from the chassis housing 213, in some embodiments, the midplane bus assembly 510 may be coupled to the panel communications unit 160 by a non-rigid midplane cable 515 (for example, a ribbon cable). The midplane cable 515 may be connected to the midplane bus assembly 510 by a connector 610. In some embodiments, the midplane bus assembly 510 may be implemented as a singular component, thus eliminating a number of unnecessary electrical connection points between the port adapter assemblies 300 and the panel communications unit 160.

It should be understood that each blade 230 of the bladed panel system 200 would include its own independent midplane bus assembly 510 and midplane cable 515 to couple the port adapter assemblies 300 to the panel communication unit 160. The application 163 processes port occupancy logic information obtained from each sensor circuit 154 for each port adapter assembly 155, identifying which blade 230 the information was received for and mapping the port occupancy status indicated by the logic signals to port numbers corresponding to the ports of that blade.

Figure 7:
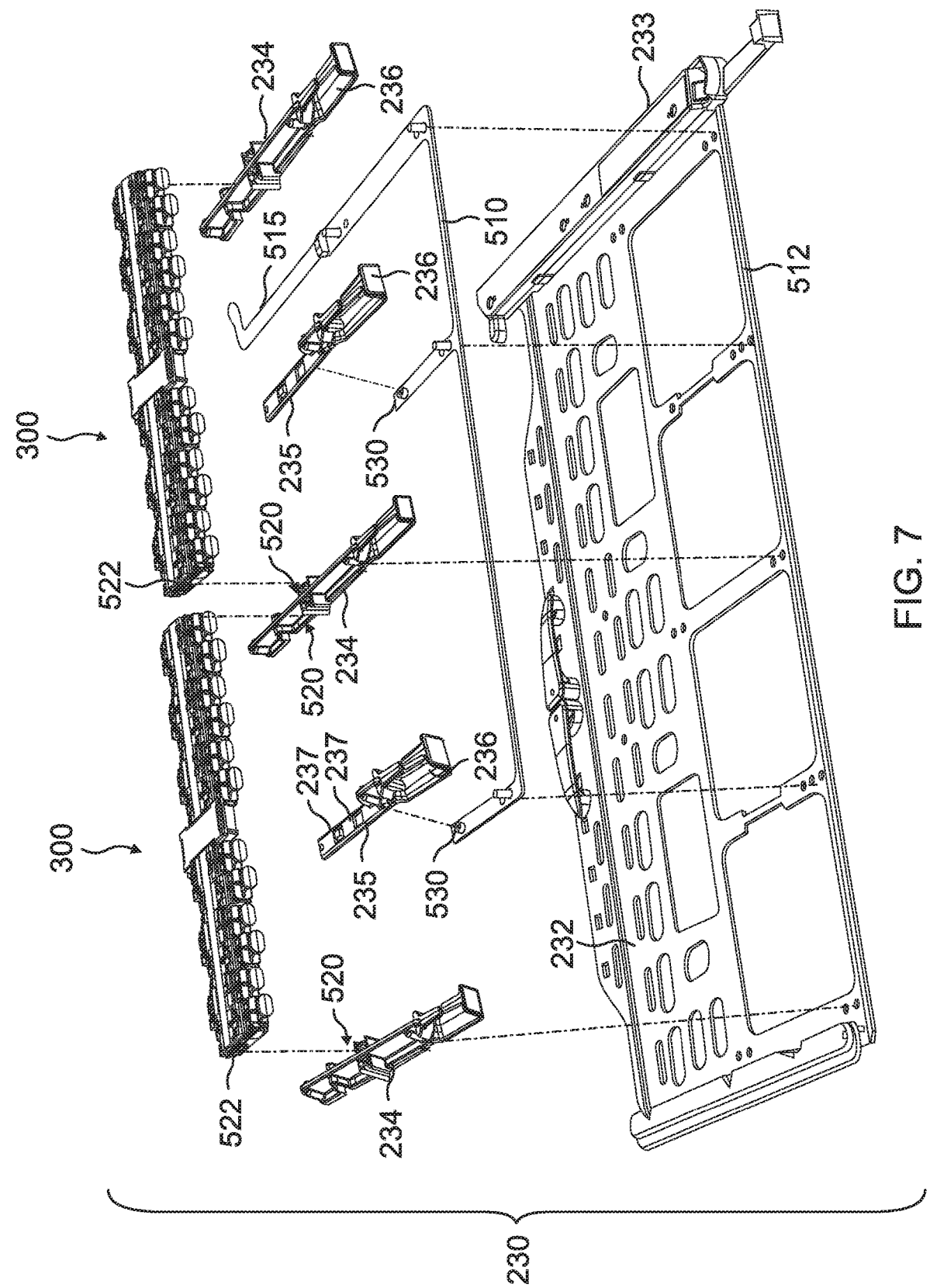
FIG. 7 illustrates an example blade from which the various components are exploded for ease in viewing.

FIG. 7 illustrates an example blade 230 carrying two port adapter assemblies 300 and corresponding circuit arrangement to connect the sensing circuits of the port adapter assemblies 300 to the panel communication unit 160. The blade 230 includes a blade base 232 carrying a latching arrangement 233. The blade base 232 defines or supports the one or more rails 512 or other structural components upon which the midplane bus assembly 510 is mounted.

One or more mounting members 234 may be mounted to the blade base 232 to hold the port adapter assemblies 300. Each mounting member 234 defines the mounting features 520 to which one or more port adapter assemblies 300 attach. For example, each mounting member 234 can define a latch arrangement 520 configured to receive a retainer 522 disposed at an end of one of the port adapter assemblies 300. In an example, each mounting member 234 defines two latch arrangements 520 facing in opposite directions.

One or more cover members 235 may be mounted over the midplane bus assembly 510 to protect the midplane bus assembly 510 and/or the connectors 530. In the example shown, each cover member 235 is disposed between two mounting members 234 to align with the sense circuit connector 324 of a respective port adapter assembly 300. Each cover members 235 defines one or more apertures 237 to allow a connection between the sense circuit connector 324 and a respective one of the connectors 530 of the midplane bus assembly 510.

In certain implementations, one or both of the mounting members 234 and the cover members 235 define cable retention sections 236 to aid in managing cables routed to the ports of the port adapter assemblies 300. In certain examples, the cable retention sections 236 define cable loop retainers. In other examples, the cable retention sections 236 define retainer fingers, bend radius limiters, or other cable management structures.

In some embodiments, a bladed panel system 200 may comprise more than one panel communications unit 160 to facilitate processing signals from a greater number of port adapter assemblies 300. For example, whereas a 2RU version of the bladed panel system 200 may have a single panel communications unit 160, a 4RU version of the bladed panel system 200 (having twice the number off blades 230 and thus twice the number of communications couplers 250) may have two panel communications unit 160. The two panel communications unit 160 may independently communicate with the gateway 112, or be connected to each other in a daisy chain fashion to share information, with only one communicating with the gateway 112.

Figure 8:
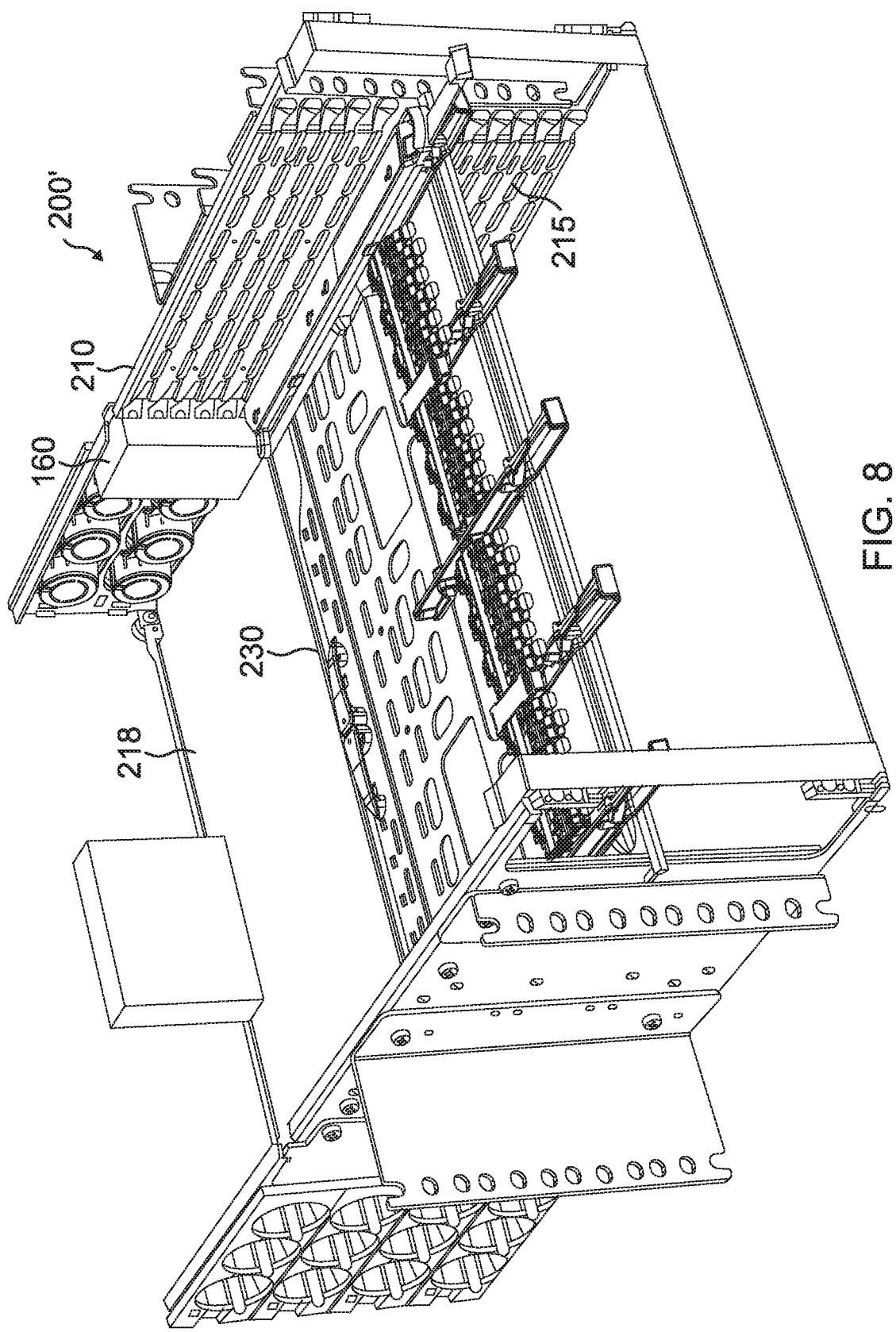
FIG. 8 illustrates an example chassis panel shown populated by a single blade for ease in viewing.

For example, FIG. 8 illustrates an example bladed panel system 200' that is substantially the same as the bladed panel system 200 shown above, except that the interior of the bladed panel system 200' is separated into an upper region and a lower region by a shelf 218. Each of the upper and lower regions holds one or more blades 230. The shelf 218 may assist in managing optical fibers entering the rear of the chassis 210 and routed to the blades 230 in the upper region. In certain examples, a first panel communications unit 160 is disposed in the upper region and a second panel communications unit is disposed in the lower region.

It should be understood that each of the embodiments described above may be extended to other embodiments for connector panels that do not utilize communicates blades, or that only partially utilize communications blades. That is, the chassis of a connector panel may comprise other structures for supporting and organizing the connection ports, port occupancy sensors, communications couplers, and other elements described above. Such alternate configurations are expressly contemplated as additional embodiments within the scope of this disclosure

EXAMPLE EMBODIMENTS

Example 1 includes a port occupancy monitoring system, the system comprising; a gateway coupled to a network; and a plurality of connector panels coupled to the network, each connector panel comprising a bladed panel system that includes a panel communications unit communicatively coupled to the network; wherein the bladed panel system comprises: a chassis including sidewalls extending between a front and a rear to define an interior, the chassis including guides, the guides extending in a forward-rearward direction; and a plurality of blades mounted to the guides of the chassis, each blade including at least one modular port adapter assembly comprising: a plurality of communications couplers; and a plurality of port occupancy sensors each coupled to a sensor circuit, wherein each of the plurality of port occupancy sensors are configured to sense when one or more of the plurality of communications couplers are occupied by a connector for a segment of physical communications media; wherein the panel communications unit is configured to obtain from the sensor circuit which of the plurality of communications couplers are occupied; and wherein the panel communications unit communicates port occupancy information to the gateway indicating which of the plurality of communications couplers are occupied.

Example 2 includes the system of example 1, wherein the plurality of port occupancy sensors are each associated with a respective one of the plurality of communications couplers, or one or more individual fibers received by one of the plurality of communications couplers.

Example 3 includes the system of any of examples 1-2, wherein each blade further includes a midplane bus assembly configured to communicatively couple the sensor circuit of the at least one modular port adapter assembly to the panel communication unit.

Example 4 includes the system of example 3, wherein the at least one modular port adapter assembly comprises a first connector coupled to the sensor circuit, wherein a first midplane bus assembly of a first blade comprises a second connector, wherein the first connector is positioned to mate with the second connector when the at least one modular port adapter assembly is installed on the first blade.

Example 5 includes the system of any of examples 3-4, wherein each blade is configured to move in forward and rearward directions along a respective one of the guides relative to the chassis between at least a closed position and a first extended position; and wherein the midplane bus assembly is communicatively coupled to the panel communication unit via a flexible cable.

Example 6 includes the system of any of examples 1-5, wherein the network comprises a wired network.

Example 7 includes the system of any of examples 1-6, wherein the network comprises a wireless mesh network, wherein each of the plurality of connector panels and the gateway define a node of the wireless mesh network.

Example 8 includes the system of example 7, wherein the wireless mesh network comprises a THREAD mesh network.

Example 9 includes the system of any of examples 7-8, wherein each of the plurality of connector panels are individually network-addressable nodes of the wireless mesh network.

Example 10 includes the system of any of examples 1-9, wherein each of port occupancy sensors comprise a microswitch or contact configured to toggle a logic voltage at the sensor circuit in response to the connector for the segment of physical communications media being inserted or removed from the plurality of communications couplers.

Example 11 includes the system of any of examples 1-10, wherein the plurality of communications couplers comprises: a Lucent Connector (LC); a duplex LC port; a Standard Connector (SC) port; or a multiple-fiber push-on/pull-off (MPO/MTP) port.

Example 12 includes the system of any of examples 1-11, wherein the panel communications unit periodically polls the sensor circuit.

Example 13 includes the system of any of examples 1-12, wherein the panel communications unit polls the sensor circuit in response to a signal received from the sensor circuit.

Example 14 includes the system of any of examples 1-13, wherein the gateway is coupled to a second network, wherein the gateway is configured to communicate the port occupancy information for each of the plurality of connector panels to a remote user.

Example 15 includes the system of example 14, wherein the gateway executes either a web server or an application program interface (API), wherein the remote user accesses the web server or the API to obtain the port occupancy information.

Example 16 includes the system of any of examples 14-15, wherein the API comprises a HyperText Transfer Protocol (HTTP) Representational State Transfer (RESTful) API.

Example 17 includes the system of any of examples 1-16, wherein at least one of the plurality of connector panels comprises more than one panel communication unit.

Example 18 includes the system of any of examples 1-17, wherein one or more of the plurality of connector panels are installed in a network rack.

Example 19 includes the system of any of examples 1-18, wherein the panel communication unit comprises: a processor and memory, wherein the processor is configured to execute one or more applications; and a network interface configured to establish communication links with the network; wherein the one or more applications process port occupancy information obtained from the sensor circuit and map the port occupancy information to port identification information corresponding to each of the plurality of communications couplers.

Example 20 includes the system of example 19, wherein the one or more applications periodically poll the sensor circuit to retrieve port occupancy status information.

Example 21 includes the system of any of examples 19-20, wherein the one or more applications poll the sensor circuit to retrieve port occupancy status information in response to a signal received from the sensor circuit that indicates a port occupancy status has changed.

Example 22 includes the system of any of examples 19-21, wherein the one or more applications retrieve port occupancy status information from the sensor circuit in response to a request, query, or polling received from the gateway.

Example 23 includes a connector panel, the panel comprising: a panel communications unit communicatively coupled to a network; and at least one modular port adapter assembly comprising: a plurality of communications couplers; and a plurality of port occupancy sensors each coupled to a sensor circuit, wherein each of the plurality of port occupancy sensors are configured to sense when one or more of the plurality of communications couplers are occupied by a connector for a segment of physical communications media; wherein the panel communications unit is configured to obtain from the sensor circuit which of the plurality of communications couplers are occupied; wherein the panel communications unit communicates to a gateway via the network, port occupancy information indicating circuit which of the plurality of communications couplers are occupied; a chassis including sidewalls extending between a front and a rear to define an interior, the chassis including guides, the guides extending in a forward-rearward direction; and a plurality of blades mounted to the guides of the chassis, each blade including a midplane bus assembly configured to communicatively couple the sensor circuit to the panel communication unit.

Example 24 includes the panel of example 23, wherein the network comprises a wireless mesh network.

Example 25 includes the panel of any of examples 23-24, wherein each of the plurality of blades is configured to move in forward and rearward directions along a respective one of the guides relative to the chassis between at least a closed position and a first extended position; and wherein the midplane bus assembly is communicatively coupled to the panel communication unit via a flexible cable.

Example 26 includes the panel of any of examples 23-25, wherein the at least one modular port adapter assembly is removably coupled to the midplane bus assembly by a connector.

Example 27 includes the panel of any of examples 23-26, wherein the midplane bus assembly comprises a one-piece printed circuit board assembly.

Example 28 includes the panel of any of examples 23-27, wherein the plurality of communications couplers comprises: a Lucent Connector (LC); a duplex LC port; a Standard Connector (SC) port; a multiple-fiber push-on/pull-off (MPO/MTP) port; an LX.5 connector port; an RJ-45 connector port; an ST connector port; an FC connector port; an E-2000 connector port; an SN connector port; or a CS Connector port.

Example 29 includes the panel of any of examples 23-28, wherein the network comprises a wireless THREAD mesh network.

Example 30 includes the panel of any of examples 23-29, wherein the panel communication unit is accessible through the gateway using a network address assigned to the panel communication unit.

Example 31 includes the panel of any of examples 23-30, wherein each of port occupancy sensors comprise a microswitch or contact configured to toggle a logic voltage state at the sensor circuit in response to the connector for the segment of physical communications media being inserted or removed from the plurality of communications couplers; and wherein the panel communication unit is configured to read the logic voltage state associated with each of the port occupancy sensors.

In various alternative embodiments, system and/or device elements, method steps, or example implementations described throughout this disclosure (such as any of the panel communications units, gateway, or sub-parts of any thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "server", "node", "client", "application", "memory", "processor", "assembly", "panel", "gateway", "interface", "sensor", "port", "unit", "network", "circuit", and the like, each refer to non-generic device elements that would be recognized and understood by those of skill in the art as defining a structure and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A port occupancy monitoring system, the system comprising:
   a gateway coupled to a network; and
   a plurality of connector panels coupled to the network, each connector panel comprising a bladed panel system that includes a panel communications unit communicatively coupled to the network;

wherein the bladed panel system comprises:
  a chassis including sidewalls extending between a front and a rear to define an interior, the chassis including guides, the guides extending in a forward-rearward direction; and
  a plurality of blades mounted to the guides of the chassis, each blade including at least one modular port adapter assembly comprising:
    a plurality of communications couplers; and
    a plurality of port occupancy sensors each coupled to a sensor circuit, wherein each of the plurality of port occupancy sensors are configured to sense when one or more of the plurality of communications couplers are occupied by a connector for a segment of physical communications media;
  wherein the panel communications unit is configured to obtain from the sensor circuit which of the plurality of communications couplers are occupied; and
  wherein the panel communications unit communicates port occupancy information to the gateway indicating which of the plurality of communications couplers are occupied.

2. The system of claim 1, wherein the plurality of port occupancy sensors are each associated with a respective one of the plurality of communications couplers, or one or more individual fibers received by one of the plurality of communications couplers.

3. The system of claim 1, wherein each blade further includes a midplane bus assembly configured to communicatively couple the sensor circuit of the at least one modular port adapter assembly to the panel communication unit.

4. The system of claim 3, wherein the at least one modular port adapter assembly comprises a first connector coupled to the sensor circuit, wherein a first midplane bus assembly of a first blade comprises a second connector, wherein the first connector is positioned to mate with the second connector when the at least one modular port adapter assembly is installed on the first blade.

5. The system of claim 3, wherein each blade is configured to move in forward and rearward directions along a respective one of the guides relative to the chassis between at least a closed position and a first extended position; and
  wherein the midplane bus assembly is communicatively coupled to the panel communication unit via a flexible cable.

6. The system of claim 1, wherein the network comprises a wireless mesh network, wherein each of the plurality of connector panels and the gateway define a node of the wireless mesh network.

7. The system of claim 6, wherein the wireless mesh network comprises a THREAD mesh network.

8. The system of claim 6, wherein each of the plurality of connector panels are individually network-addressable nodes of the wireless mesh network.

9. The system of claim 1, wherein each of the port occupancy sensors comprise a microswitch or contact configured to toggle a logic voltage at the sensor circuit in response to the connector for the segment of physical communications media being inserted or removed from the plurality of communications couplers.

10. The system of claim 1, wherein the panel communications unit periodically polls the sensor circuit.

11. The system of claim 1, wherein the panel communications unit polls the sensor circuit in response to a signal received from the sensor circuit.

12. The system of claim 1, wherein the gateway is coupled to a second network, wherein the gateway is configured to communicate the port occupancy information for each of the plurality of connector panels to a remote user.

13. The system of claim 12, wherein the gateway executes either a web server or an application program interface (API), wherein the remote user accesses the web server or the API to obtain the port occupancy information.

14. The system of claim 12, wherein the API comprises a HyperText Transfer Protocol (HTTP) Representational State Transfer (RESTful) API.

15. The system of claim 1, wherein at least one of the plurality of connector panels comprises more than one panel communication unit.

16. The system of claim 1, wherein one or more of the plurality of connector panels are installed in a network rack.

17. The system of claim 1, wherein the panel communication unit comprises:
  a processor and memory, wherein the processor is configured to execute one or more applications; and
  a network interface configured to establish communication links with the network;
  wherein the one or more applications process port occupancy information obtained from the sensor circuit and map the port occupancy information to port identification information corresponding to each of the plurality of communications couplers.

18. The system of claim 17, wherein the one or more applications periodically poll the sensor circuit to retrieve port occupancy status information.

19. The system of claim 17, wherein the one or more applications poll the sensor circuit to retrieve port occupancy status information in response to a signal received from the sensor circuit that indicates a port occupancy status has changed.

20. The system of claim 17, wherein the one or more applications retrieve port occupancy status information from the sensor circuit in response to a request, query, or polling received from the gateway.

21. A connector panel, the panel comprising:
  a panel communications unit communicatively coupled to a network; and
  at least one modular port adapter assembly comprising:
    a plurality of communications couplers; and
    a plurality of port occupancy sensors each coupled to a sensor circuit, wherein each of the plurality of port occupancy sensors are configured to sense when one or more of the plurality of communications couplers are occupied by a connector for a segment of physical communications media;
  wherein the panel communications unit is configured to obtain from the sensor circuit which of the plurality of communications couplers are occupied;
  wherein the panel communications unit communicates to a gateway via the network, port occupancy information indicating circuit which of the plurality of communications couplers are occupied;
  a chassis including sidewalls extending between a front and a rear to define an interior, the chassis including guides, the guides extending in a forward-rearward direction; and
  a plurality of blades mounted to the guides of the chassis, each blade including a midplane bus assembly configured to communicatively couple the sensor circuit to the panel communication unit.

22. The panel of claim 21, wherein the network comprises a wireless mesh network.

23. The panel of claim 21, wherein each of the plurality of blades is configured to move in forward and rearward directions along a respective one of the guides relative to the chassis between at least a closed position and a first extended position; and wherein the midplane bus assembly is communicatively coupled to the panel communication unit via a flexible cable.

24. The panel of claim 21, wherein the at least one modular port adapter assembly is removably coupled to the midplane bus assembly by a connector.

25. The panel of claim 21, wherein the midplane bus assembly comprises a one-piece printed circuit board assembly.

26. The system of claim 1 or the panel of claim 21, wherein the plurality of communications couplers comprises:
- a Lucent Connector (LC);
- a duplex LC port;
- a Standard Connector (SC) port;
- a multiple-fiber push-on/pull-off (MPO/MTP) port;
- an LX.5 connector port;
- an RJ-45 connector port;
- an ST connector port;
- an FC connector port;
- an E-2000 connector port;
- an SN connector port; or
- a CS Connector port.

27. The panel of claim 21, wherein the network comprises a wireless THREAD mesh network.

28. The panel of claim 21, wherein the panel communication unit is accessible through the gateway using a network address assigned to the panel communication unit.

29. The panel of claim 21, wherein each of port occupancy sensors comprise a microswitch or contact configured to toggle a logic voltage state at the sensor circuit in response to the connector for the segment of physical communications media being inserted or removed from the plurality of communications couplers; and wherein the panel communication unit is configured to read the logic voltage state associated with each of the port occupancy sensors.

30. A method for a connector panel that comprises: a panel communications unit communicatively coupled to a network; a chassis including sidewalls extending between a front and a rear to define an interior, the chassis including guides, the guides extending in a forward-rearward direction and a plurality of blades mounted to the guides of the chassis, and at least one modular port adapter assembly that includes a plurality of communications couplers and a plurality of port occupancy sensors each coupled to a sensor circuit, the method comprising:

sensing when one or more of a plurality of communications couplers are occupied by a connector for a segment of physical communications media;

obtaining from a sensor circuit which of the plurality of communications couplers are occupied;

communicating from the panel communications unit to a gateway via the network, port occupancy information indicating circuit which of the plurality of communications couplers are occupied, wherein each blade includes a midplane bus assembly configured to communicatively couple the sensor circuit to the panel communication unit.

31. The method of claim 30, wherein each of the plurality of blades is configured to move in forward and rearward directions along a respective one of the guides relative to the chassis between at least a closed position and a first extended position; and wherein the midplane bus assembly is communicatively coupled to the panel communication unit via a flexible cable.

32. The method of claim 30, wherein the at least one modular port adapter assembly is removably coupled to the midplane bus assembly by a connector.

33. The method of claim 30, wherein each of port occupancy sensors comprise a microswitch or contact configured to toggle a logic voltage state at the sensor circuit in response to the connector for the segment of physical communications media being inserted or removed from the plurality of communications couplers; and wherein the panel communication unit is configured to read the logic voltage state associated with each of the port occupancy sensors.

* * * * *

UNITED STATES PATENT AND TRADEMARK OFFICE
CERTIFICATE OF CORRECTION

| | | |
|---|---|---|
| PATENT NO. | : 11,962,955 B2 | Page 1 of 1 |
| APPLICATION NO. | : 17/286731 | |
| DATED | : April 16, 2024 | |
| INVENTOR(S) | : Kiener et al. | |

It is certified that error appears in the above-identified patent and that said Letters Patent is hereby corrected as shown below:

In the Specification

Under "Cross-Reference to Related Applications": At Column 1, Line 13, please replace --mare-- with "are" between "each of which" and "incorporated herein".

In the Claims

Claim 26: at Column 17, Line 13, please delete "system of claim 1 or the" between "The" and "panel of claim 21".

Signed and Sealed this
Eighteenth Day of June, 2024

Katherine Kelly Vidal
*Director of the United States Patent and Trademark Office*